May 14, 1963 S. A. SCHERBATSKOY 3,089,955
STABILIZED RADIATION DETECTOR
Filed Aug. 17, 1959 2 Sheets-Sheet 1

INVENTOR.
George A Scherbatskoy
by Dorns, McDougall, Williams & Hersh
Attorneys

May 14, 1963 S. A. SCHERBATSKOY 3,089,955
STABILIZED RADIATION DETECTOR
Filed Aug. 17, 1959 2 Sheets-Sheet 2

INVENTOR.
Serge A. Scherbatskoy
by Dooms, McDougall, Williams & Hersh
Attorneys

United States Patent Office 3,089,955
Patented May 14, 1963

3,089,955
STABILIZED RADIATION DETECTOR
Serge A. Scherbatskoy, 1220 E. 21st St., Tulsa 14, Okla.
Filed Aug. 17, 1959, Ser. No. 834,182
5 Claims. (Cl. 250—71.5)

This invention relates to the detection and measurement of radiation, and more particularly to a scintillation counter for measuring the intensity and energy of such radiation as alpha, beta, gamma rays, neutrons, or any other radiations resulting from nuclear transmutations or disintegrations.

As is well known, the detecting element of a scintillation counter consists of a suitable chosen material such as anthracene, cadmium tungstate, sodium iodide, cesium iodide, or lithium iodide, commonly referred to as a "phosphor," that is adapted to scintillate, i.e. to generate light flashes responsively to interactions with radiation such as gamma-ray photons or neutrons. In traversing the phosphor the ray to be detected loses energy in exciting and ionizing the molecules of the phosphor, which then radiate energy in the form of fluorescent light, some of which is collected on the photocathode of a photomultiplier tube.

A photomultiplier tube, even very carefully made to any specification, will not generally exhibit uniformity in all its characteristics under practical operating conditions. The extreme sensitivity of the multiplier tube subjects the apparatus to noises and drifts, the origin of which is often uncertain. Furthermore, the characteristics of the multiplier tend to change with time, temperature, and exposure to radiation, supply voltage, and other factors. The "dark current" from the cathode also contributes a variable background noise.

It is the purpose of my invention to compensate for changes in a photomultiplier tube apparatus and to provide an automatic controlling arrangement that will insure stability of operation.

It is another purpose of my invention to compensate for changes in a multiplier tube and to provide an automatic controlling arrangement for varying the selectivity of an amplitude-selective network in response to the variation in sensitivity of the multiplier tube.

Other objects, together with some of the advantages to be derived in utilizing the present invention, will become apparent from the following detailed description taken together with the accompanying drawings in which.

Figure 1:
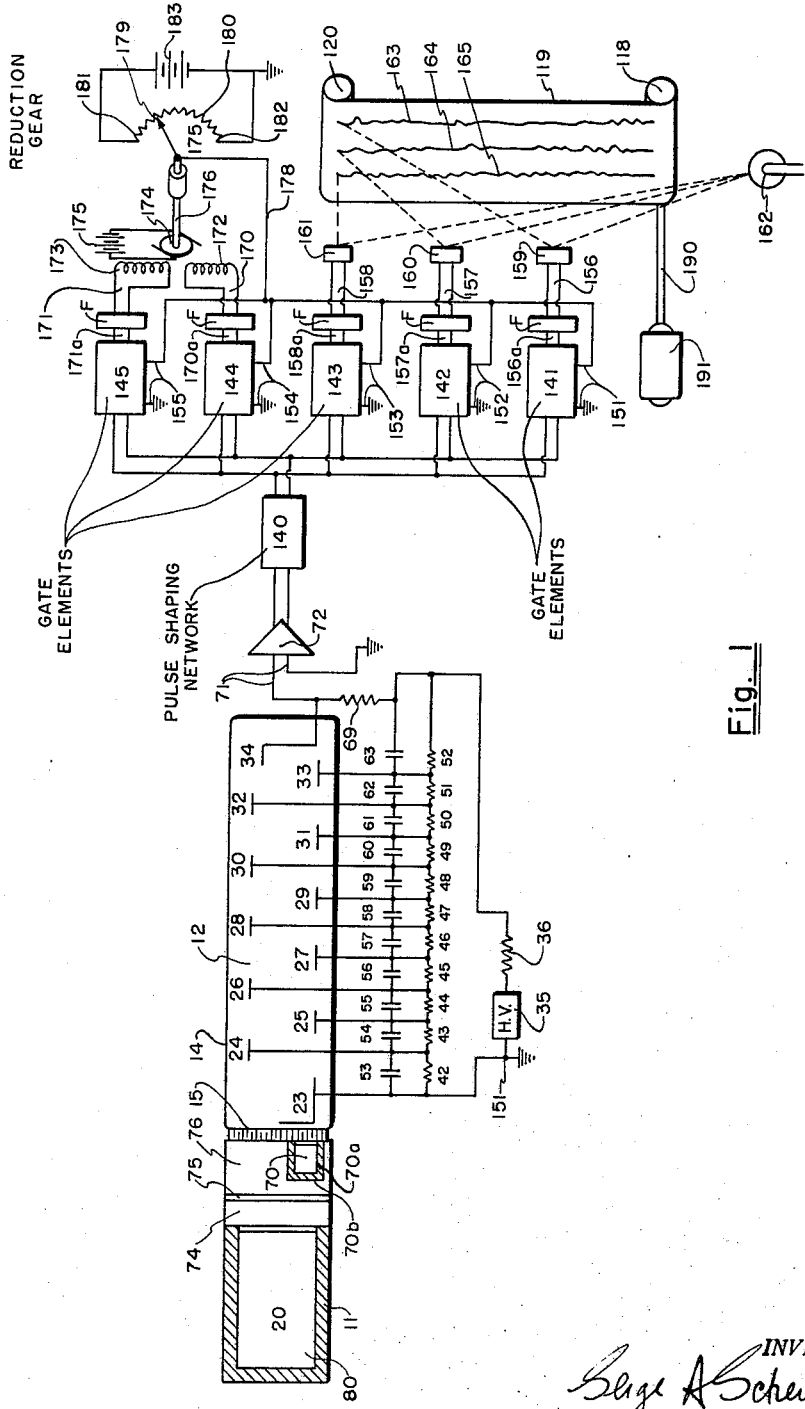
FIG. 1 illustrates an embodiment of my invention in which provision has been made for varying the selectivity of an amplitude-selective network in response to the variation in sensitivity of a photomultiplier.
Figure 1A:
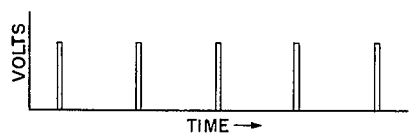
FIGS. 1a and 1b illustrate certain pulse shapes produced by part of the apparatus of FIG. 1.
Figure 1B:
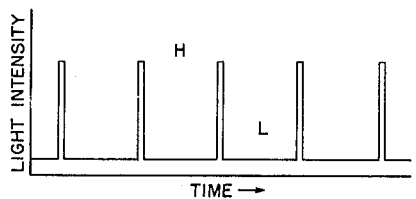

An important feature of my invention is the provision of a system for continuousuly comparing the intensity of the light flashes generated in a scintillation counter to standard reference light pulses. In my invention the comparison is made automatically so that for all practical purposes variations in the instrument characteristics have little or no effect upon the measurement, the magnitude under study being continuously compared to a reference magnitude.

A convenient source of reference light pulses can be obtained by utilizing a radioactive substance emitting monochromatic charged particles and causing a scintillation crystal to absorb said particles, thereby producing a succession of light pulses having uniform intensity, each of which has an intensity directly related to the energy of the absorbed charged particles. More specifically, the source of reference light pulses may consist of a small crystal of thallium-activated sodium iodide which contains dispersed therein a small amount of plutonium 239. The reference light pulses are produced within the sodium iodide crystal as the result of absorption of the 5.1 mev. alpha rays emitted by the plutonium.

In such an arrangement a photomultiplier is placed in optically coupled relation to the small crystal containing the radioactive element which serves as a source of reference pulses. In addition to said small crystal, a relatively much larger scintillating crystal is also optically coupled to the photomultiplier, the purpose of the large crystal being to detect incident radiation and to generate light flashes of corresponding magnitudes, said flashes acting on the photomultiplier and causing it to produce current impulses.

Instead of plutonium 239, the small crystal may contain some other radioactive element such as uranium 238, polonium 210, ionium 230 (isolated from its daughter products), radium D 210 in equilibrium with its daughter products, or any other radioactive substance emitting highly ionizing particles.

It is apparent that in the arrangement as described above the photomultiplier is exposed simultaneously to the reference flashes originated by the 5.1 mev. alpha rays from plutonium and to the flashes derived from the incident radiation which it is desired to measure, and it hence produces two sets of current pulses corresponding to the two types of flashes.

An important feature of my invention is the provision of an arrangement by means of which the reference pulses are easily distinguishable from the signal pulses. I have found that it is desirable to provide reference pulses substantially larger than any of the signal pulses resulting from the nuclear radiation being measured. Thus the reference pulses occupy a range of magnitudes which is unoccupied by other pulses and this makes it possible to pick up and select the reference pulses by very simple circuitry, as, for example, by a threshold device responsive to all pulses above a predetermined magnitude.

My invention is particularly concerned with nuclear spectroscopy and pulse height analysis in which nuclear radiation causes a scintillating crystal or phosphor to emit light flashes, the magnitude and repetition rate of which define the characteristics of the incoming radiation beam.

Referring now more particularly to FIG. 1, the arrangement shown therein comprises two thallium-activated sodium iodide crystals placed in cooperative relationship with the photomultiplier 12. One of these crystals of relatively large size contained within the housing 11, and designated by the numeral 20, is the "main" crystal, i.e., the sensing element of the instrument. It is exposed to the incident "signal radiation" of which detection and analysis is desired. As a result of interactions with such radiation, light flashes are produced within the crystal 20, and these flashes in turn act upon the photomultiplier 12, whereby the photomultiplier generates current pulses having magnitudes representing the energy of the radiation particles and/or quanta absorbed in the sodium iodide crystal 20.

The other crystal 70 cooperating with the photomultiplier 12 is of relatively small size and contains a radio-element in the melt, as a result of which it is made to interact continually with the rays emitted by this radio-element; for example. the 5.1 mev. alpha particles emitted by plutonium. As a result of this interaction the auxiliary crystal continually emits pulses of light of substantially constant magnitude, the magnitude of each of said pulses having definite relation to the energy of the particles emitted. The auxiliary crystal is used in this arrangement as a source of reference light flashes and its purpose is to stabilize the performance of the measuring system. On the other hand, the main crystal is used as a sensing element and its purpose is to detect the incident radiation to be measured and to produce flashes indicating the character of such radiation.

Crystal 70 is provided with a reflecting surface 70a on all sides except the one exposed to the photomultiplier and also is provided with a light shield 70b. The purpose of the light shield is to prevent any light from the pilot crystal from going backwards and getting reflected by reflector 11. This light shield is made sufficiently thick so as also to prevent any undesired nuclear radiation from the crystal 70 from reaching the crystal 20.

Photomultiplier 12 is continually exposed to light flashes derived from the auxiliary crystal 70 and also those derived from the main crystal 20. The light flashes derived from the auxiliary crystal represent alpha particles having energy 5.1 mev., and those derived from the main crystal represent the energies of various incident particles interacting with it.

The light flashes derived from the main crystal 20 may have the same magnitude or may differ only little in magnitude from the pilot flashes derived from the auxiliary crystal 70. Thus difficulty may be experienced in identifying the photomultiplier current pulses derived from pilot flashes and separating them from the pulses derived from flashes occurring in the main crystal.

It is therefore an important purpose of this invention to separate the two types of light pulses referred to above and to arrange the system in such a manner that the pulses derived from the auxiliary crystal are contained within a range of magnitudes considerably different from the magnitudes representing the incident pulses to be measured. In such a manner the pulses derived from the auxiliary crystal can be easily separated for stabilization purposes.

One means of accomplishing the above objective within my invention is by providing a light attenuator interposed between the main crystal 20 and the photomultiplier 12, whereby the flashes of light derived from the main crystal are attenuated by a suitable factor, such as one-half. The auxiliary crystal 70 is placed close to the photomultiplier 12 without any light attenuator interposed therebetween, and reference light pulses derived from the auxiliary crystal are thus not attenuated. As a result of this arrangement, the 5.1 mev. standard within the auxiliary crystal produces light flashes of the same intensity that would reach the photomultiplier from the main crystal if it were irradiated by 10.2 mev. alpha rays, which are above our range of interest.

As shown in FIG. 1 the optical attenuator interposed between the main crystal 20 and the photomultiplier 12 consists of plastic light pipe 74, a light attenuator 75 adjacent to the light pipe 74, and another light pipe 76 placed between the light attenuator 75 and the transparent wall 15 of the photomultiplier. The small auxiliary crystal 70 is imbedded in the light pipe 76 and has one of its surfaces adjacent the wall 15.

The light attenuator 75 is in form of a plate made of a suitable substance having limited transparency such as Teflon. Various light attenuators of this and other types are manufactured by Eastman Kodak Company.

It is well known that the sensitivity of a photomultiplier circuit is subject to drift variation and other uncontrollable changes, an important one being due to variations in the high voltage supply. In my invention I vary the selectivity of the amplitude-selective network comprising the gates 141, 142, and 143 in order to compensate for variation in the sensitivity of the photomultiplier 12. This variation in selectivity is accomplished by means of a suitable controlling mechanism which utilizes the reference light flashes of constant intensity produced by crystal 70. These light flashes produce corresponding reference current pulses at the output terminals 71 of the photomultiplier 12. Because of the presence of the optical attenuator interposed between the large crystal 20 and the photomultiplier 12 the reference current pulses are considerably greater in magnitude than any of the current pulses at the photomultiplier output due to light flashes originating at the large crystal 20.

The magnitude of the reference current pulses serves as an index of the sensitivity of the photomultiplier. If the sensitivity of the photomultiplier 12 decreases, the pulses generated by the reference light flashes decrease in magnitude; conversely, if the sensitivity of the photomultiplier 12 increases, the pulses generated by the reference light flashes increase in magnitude. In the FIG. 1 embodiment of my invention, I provide controlling mechanism, for varying the selectivity of the amplitude-selective network, which is responsive to increase or decrease in magnitude of the reference pulses. Thus, if the sensitivity of the photomultiplier decreases, the controlling mechanism shifts the amplitude-selective network so as to accept amplitudes of correspondingly lower values, and if the sensitivity of the photomultiplier increases, the controlling mechanism shifts the amplitude-selective networks so as to accept amplitudes of correspondingly higher values.

The photomultiplier 12 may be of a standard construction within a cylindrical enclosure 14 provided with a transparent wall 15. The photomultiplier has a photosensitive cathode 23, a plurality of dynodes 24–33, and an anode 34, each electrode being at a higher potential than the preceding one. The dynode potentials are derived from a voltage-dividing circuit consisting of a high voltage supply 35 in series with a resistor 36 and a plurality of resistor elements 42–52, said resistor elements being individually shunted by condensers 53–63, respectively. The voltage applied across the resistors 42–52 is approximately 1100 volts. Consequently, the voltage applied across each of said resistors is approximately 100 volts. The voltage across the resistor 42 is applied between the photocathode 23 and the dynode 24, the voltage across the resistor 43 is applied across the dynodes 24, 25 and the voltages across the resistors 44, 45, 46, 47, 48, 49, 50, 51 are applied across the dynodes 25—26, 26—27, 27—28, 28—29, 29—30, 30—31, 31—32, 32—33, respectively.

The voltage derived from the resistor 52 is applied across the electrodes 33—34 in series with the load resistor 69. The output leads 71 connect the photomultiplier output to an amplifier 72, and the output terminals of the amplifier are in turn connected to the pulse-shaping network 140. For a description of a suitable pulse-shaping network see J. W. Coltman and Fitz-Hugh Marshall, Nucleonics 1, 1947, p. 58.

The photocathode 23 is subjected to light impulses derived from two different sources: first, the light pulses due to the interaction of the incident nuclear radiation 80 with the phosphor 20, and second, reference light pulses derived from the auxiliary crystal 70. Because of the optical attenuator the reference pulses are of higher intensity than the pulses resulting from the interactions of the crystal 20 with the incident nuclear radiation 80. Both these groups of pulses are amplified by the familiar secondary emission system of the multiplier tube comprising the photocathode 23 and the dynodes 24–33, each at a higher potential than the preceding one. Each photoelectron is swept to the first dynode by a potential difference of about a hundred volts and ejects four or five secondary electrons. These in turn are swept to the second dynode and similarly multiplied by the secondary emission amplification. After nine such stages, an avalanche of a million electrons, more or less, appears at the output of the photomultiplier tube as a result of each initial photoelectron, producing across the output terminals 71 a succession of current pulses. Some of these pulses of uniform and relatively large magnitude are due to the reference light flashes emitted by auxiliary crystal 70. Other pulses of relatively smaller and non-uniform magnitudes are caused by the interaction of incident nuclear radiation (of the beam 80) with the phosphor 20.

Figure 2:
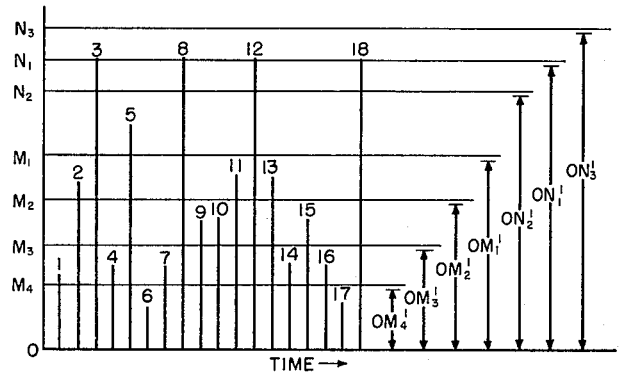
FIG. 2 illustrates diagrammatically a succession of current impulses obtained across the output terminals of the photomultiplier.
Figure 4:
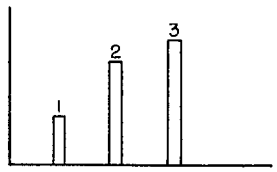
FIG. 4 shows diagrammatically the output of a pulse shaping network.

All of the above pulses are subsequently amplified in the amplifier 72, said amplifier being connected to the pulse-shaping network 140 which is designed to provide for each pulse a corresponding output voltage pulse that will have a somewhat longer duration (and preferably a rectangular shape) and a variable height as shown in FIG. 4, said height representing the magnitude of the impulse. The output of said pulse-shaping network therefore consists of a succession of discrete pulses, the magnitude of each pulse serving to identify the energies of individual photons or quanta comprised in the radiation field 80 and the intensity of the reference pulses emitted by the auxiliary crystal 70. FIG. 2 gives a diagrammatical representation of such an output in which the abscissas represent the time of occurrence of the pulses and the ordinates represent the respective magnitudes of the pulses. The pulses have been designated by consecutive numerals such as 1, 2, 3, etc. These pulses have been subdivided into four energy groups which are designated by Roman numerals I, II, III and IV.

Group I comprises pulses smaller than a predetermined value $OM_1$ and larger than a predetermined value $OM_2$. In FIG. 2 pulses belonging to this group are designated as 2, 11, and 13.

Group II comprises pulses smaller than a predetermined value $OM_2$ and larger than a predetermined value $OM_3$. In FIG. 2 the pulses belonging to this group are designated as 9, 10, and 15.

Group III comprises pulses smaller than a predetermined value $OM_3$ and larger than a predetermined value $OM_4$. In FIG. 2 the pulses belonging to this group are designated as 1, 4, 7, 14 and 16.

Group IV comprises pulses having all substantially a predetermined value $ON_1$. These pulses represent the intensity of the light flashes produced by the auxiliary crystal 70. In FIG. 2 the pulses belonging to this group are designated as 3, 8, 12, and 18.

The output pulses as shown in FIG. 2 are simultaneously applied to five gate elements designated in FIG. 1 by numerals 141, 142, 143, 144, and 145, respectively. Each gate element is characterized by two threshold values, i.e., it is arranged to transmit only those impulses the magnitude of which is below the upper threshold and above the lower threshold.

Thus the gate 141 has an upper threshold determined by the value $OM_1$ and a lower threshold determined by the value $OM_2$. Consequently, this gate 141 transmits only the impulses of the group I. The gate 142 has an upper threshold determined by the value $OM_2$ and a lower threshold determined by the value $OM_3$. Consequently the gate 142 transmits only the impulses of the group II. The gate 143 has an upper threshold determined by the value $OM_3$ and a lower threshold determined by the value $OM_4$. Consequently the gate 143 transmits only the impulses of the group III. The gate 144 is adapted to transmit signals having magnitude $ON_2$ somewhat smaller than $ON_1$, but cannot transmit signals having magnitude $ON_1$. Consequently the upper threshold of the gate 144 is slightly above the value $ON_2$ but below the value $ON_1$, and the lower threshold is slightly below the value $ON_2$. The gate 145 is adapted to transmit signals having magnitude $ON_3$. Consequently the lower threshold of the gate 145 is slightly below the value $ON_3$ but above the value $ON_1$, and the upper threshold is above the value $ON_3$.

The gates 141, 142, 143, 144 and 145 are provided with control terminals 151, 152, 153, 154, and 155, respectively, that receive corresponding control voltages.

The magnitude of the control voltage applied to the terminals 151 determines the value of the threshold $OM_1$ and $OM_2$. By increasing (or decreasing) the control voltage the values of the threshold $OM_1$ and $OM_2$ are increased (or decreased). However, the difference between the values $OM_1$ and $OM_2$ is maintained constant. Consequently the increase (or decrease) of the control voltages causes a shift of the transmitted band of magnitudes upwards towards larger values (or downwards towards smaller values). However, the width of the transmitted band is maintained constant and independent of the variation in the control voltage.

Similarly, the magnitude of the control voltage applied to the terminals 152 and the terminals 153 determines the threshold values $OM_2$, $OM_3$, and $OM_4$. By increases or decreases in the control voltages applied to terminals 152 and 153, the threshold values $OM_2$, $OM_3$, and the threshold values $OM_3$, $OM_4$ may be correspondingly increased or decreased. However, the difference between the thresholds $OM_2$, $OM_3$ or between the thresholds $OM_3$, $OM_4$ is maintained constant and independent of the variation in the control voltage.

Figure 3:
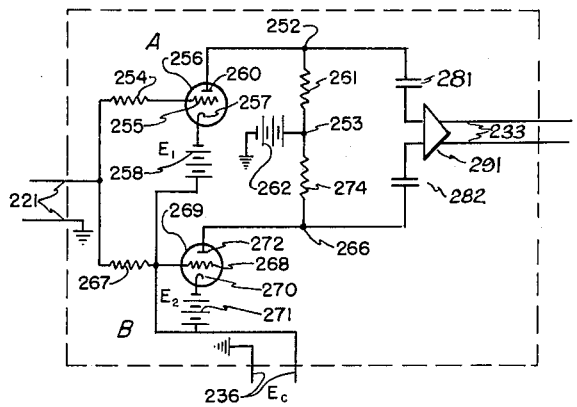
FIG. 3 shows schematically an electric circuit for transmitting impulses within a predetermined range of magnitude.

Gate elements of the characteristics herein described are per se well known in the art; a suitable circuit for such a purpose is shown in FIG. 3, presently to be described.

The output terminals of the gate elements 141, 142, 143 are connected to conventional frequency meters whose outputs are connected through leads 156, 157, 158 to galvanometer coils 159, 160, 161 respectively. The frequency meters in FIGS. 1 and 5 are designated by the letter F and may be of conventional construction. (See, for example, Type SC-34 precision ratemeter manufactured by Tracerlab, Inc.). The galvanometer coils have attached thereto suitable mirrors in a manner well known to those skilled in the art and are adapted to reflect beams of light derived from a source 162, thereby effectively producing on the sensitive film 119 a record comprising three traces designated as 163, 164, 165, respectively, and representing the variations of the voltage applied to the galvanometer coils 159, 160, 161 respectively, as shown in the figure. A shaft 190 is driven by a motor or a suitable clock mechanism 191 and carries a spool 118 for moving the photographic film from a feed spool 120 to the take up spool 118.

Thus the trace 163 represents the variation of the rate of incidence of photons or quanta within the energy range represented by pulses in group I and the traces 164 and 165 represent the corresponding variations of the rate of incidence of photons or quanta within the energy ranges represented by the pulses in groups II and III, respectively.

I shall now describe the operation of the stabilizing apparatus which comprises crystal 70 and gate elements 144 and 145.

Assume first that the photomultiplier is performing under normal operating conditions that are characterized by a certain known and predetermined sensitivity of the photomultiplier. Under these conditions the reference pulses of light emitted by the auxiliary crystal 70 and impinging upon the photocathode 23 cause an emission at the output terminals 71 of successive current impulses of uniform magnitude $ON_1$ as shown in FIG. 2. These impulses have been designated in FIG. 2 by numerals 3, 8, 12, and 18. These impulses cannot be transmitted through any of the gates 141, 142, 143. They are, moreover, too large to be transmitted through the gate 144 and too small to be transmitted through the gate 145.

Assume now that the sensitivity of the photomultiplier decreases. Consequently, the current pulses across the output terminals 71 that originate from crystal 70 decrease in size, and when they reach the magnitude $ON_2$ they pass through the gate 144, producing a voltage across the output terminals of said gate and across the leads 170.

Assume instead that the sensitivity of the photomultiplier increases. This causes the reference impulses caused by crystal 70 to increase in size, and when they reach the magnitude $ON_3$ they pass through the gate 145, producing a voltage across the leads 171.

Thus, when the sensitivity of the photomultiplier decreases a voltage appears across the terminals 170, and when the sensitivity increases, a voltage appears across the terminals 171. The terminals 170, 171 are respectively applied to excitation windings 172, 173 of a D.C. motor 174, said motor receiving its armature current supply from a battery 175. The windings 172, 173 are wound and connected to produce two opposing magnetic fluxes, responsively to currents from terminals 170 and 171 respectively.

The motor 174 is adapted to displace angularly a rotatable conductive member 175a by means of a shaft 176. When the excitation winding 170 is energized by the voltage output from the gate 144, the member 175 turns in the clockwise direction, whereas current in winding 173 causes the member 175 to turn in the anti-clockwise direction.

One terminal 177 of the member 175 at the point of rotation is connected to a lead 178 and the other terminal 179 is slidingly engaged on a fixed semicircular resistor 180, said resistor having its two terminals 181, 182 connected to a battery 183.

The voltage between the grounded terminal 182 and lead 178 decreases when the member 175 rotates clockwise and increases when it rotates anticlockwise. This voltage is simultaneously transmitted to the control terminals 151, 152, 153, 154, and 155 of the gates 141, 142, 143, 144, and 145, respectively.

In order to understand the operation of the above described compensating system, assume that the sensitivity of the photomultiplier decreases. The impulses corresponding to photons of the group I do not fall any longer within a range of magnitudes $OM_1$, $OM_2$ shown in FIG. 2. They fall within a lower range of magnitudes defined by limits $OM_1^1$ and $OM_2^1$ which are respectively below the corresponding limits $OM_1$ and $OM_2$ as shown in FIG. 2. Similarly, the impulses corresponding to gamma rays of group II and group III do not fall any more within magnitude ranges $OM_2$, $OM_3$ and $OM_3$, $OM_4$, respectively, but within lower ranges of magnitudes defined by limits $OM_2^1$, $OM_3^1$, and $OM_3^1$, $OM_4^1$, respectively.

It is therefore apparent that when the sensitivity of the photomultiplier is decreased, the gates 141, 142, 143 are not adapted any more to transmit impulses that are caused by photons belonging to the energy groups I, II, and III, respectively. It is therefore necessary to modify the transmitting characteristics of the gates 141, 142, and 143, so as to lower the bands of magnitudes from the positions $M_1$, $M_2$; $M_2$, $M_3$; and $M_3$, $M_4$ to the positions $M_1^1$, $M_2^1$; $M_2^1$, $M_3^1$; and $M_3^1$, $M_4^1$. This is effected by means of the control voltage appearing across the output terminals 170 of the gate 144 in the manner hereinabove described. Said control voltage causes the rotation of the shaft 175 in a clockwise direction. It is apparent that as the shaft 175 rotates, the control voltages applied to the terminals 151 to 155 decrease in magnitude and cause a progressive downward shift of the threshold values of the corresponding gates 141 to 145. In particular, the range of magnitudes transmitted through the gate 144 is not any more defined by the magnitude $ON_2$ but by a lower value. Consequently, the reference impulses caused by the auxiliary crystal 70 cannot pass any longer through the gate 144. Thus the voltage across the terminals 170 drops to zero and consequently the member 175 stops rotating and reaches a stationary position corresponding to a decrease in the control voltages to the terminals 151, 152, and 153 by a definite amount. This amount is such that the new thresholds corresponding to the gate 141 are not any more $OM_1$, $OM_2$ but $OM_1^1$, $OM_2^1$. The new thresholds corresponding to the gate 142 are not any more $OM_2$, $OM_3$ but $OM_2^1$, $OM_3^1$ and the new threshold values corresponding to the gate 143 are not any more $OM_3$, $OM_4$ but $OM_3^1$, $OM_4^1$.

Thus, when the sensitivity of the photomultiplier decreases, the thresholds of the gates 141, 142, 143 adjust themselves automatically so that the gate 141 will accept all the impulses originated by gamma rays of the groups II and III, respectively. A similar automatic adjustment, but in the opposite direction, takes place when the sensitivity increases.

Consider now FIG. 3 showing a schematic diagram of a gate suitable for use as one of those designated by numerals 141-145 in FIG. 1. The gate has input terminals 221, output terminals 235 and control terminals 236. The control terminals 236 may be any of those designated by 151-155 in FIG. 1 and the output leads may be any of those designated by 156a, 157a, 158a, 170a, 171a in FIG. 1.

The essential element of the gate consists of a pulse height selector comprising two individual channels designated as A and B. The pulse height selector channel is arranged to give across its output terminals a voltage pulse only when the input pulse applied to terminals 221 is contained within a predetermined range of magnitudes constituting the transmission band. This range of magnitudes is determined by the control voltage applied to the terminals 236. That is, with a certain value for the control voltage the circuit will pass only input voltage pulses within a predetermined band of magnitudes. If the input voltage pulses are outside the band no output will be produced.

Assume now that $n$ impulses having magnitudes within the transmission band enter at the input terminals 221. These impulses produce across the terminals 252, 266 $n$ voltage impulses, each of said voltage impulses having a very short duration. The channel A comprises input terminals 221, resistor 254, and triode 256, whose cathode 257 is connected to the positive terminal of biasing battery 258, its negative terminal being connected to the control terminals 236 and thence to ground. The plate 260 of this triode is connected to the output terminal 252 and to resistor 261 which in turn is connected to the positive terminal of battery 262. The negative side of battery 262 is grounded.

The channel B comprises input terminals 221, resistor 267, and triode 269, whose cathode 270 is connected to the positive terminal of biasing battery 271, its negative terminal being connected to the control terminals 236 and thence to ground. The plate 272 of the triode 269 is connected to the output terminal 266 and to resistor 274 which in turn is connected to the positive terminal of battery 262.

In reference now to channel A, it is apparent that we obtain at the output terminals 252, 253 only those input pulses that are capable of overcoming the biasing voltage of the tube 256. Assume that the voltage of the battery 258 is $E_1$ and that the voltage applied to the control terminals 236 is $E_c$. Then the total biasing voltage for tube 256 is $E_1+E_c$. Therefore, only the impulses that are capable of exceeding the threshold value provided by the total biasing voltage are transmitted through the channel A and appear across the output terminals 252, 253.

Similarly, in the channel B only those input pulses appear across the output terminals 266, 263 that are capable of overcoming the total biasing voltage of the tube 269. Assume that the voltage of the battery 271 is $E_2$. Then the total biasing voltage of the tube 269 is $E_2+E_c$. Consequently, only those impulses that are capable of exceeding the threshold value determined by $E_2+E_c$ cause pulses to appear across the terminals 266, 253.

The two output voltages across the terminals 252, 253 and 266, 253 are in opposition, so that the resultant output between the terminals 252, 266 is equal to their difference. Consider now three cases designated as (a), (b), and (c).

*Case a.*—The impulse applied to the terminals 221 has a value below the threshold voltages of the tubes 256 and 269. Consequently, no plate currents will be delivered by these tubes and no voltage will appear across the terminals 252, 266.

*Case b.*—The impulse applied to the terminals 221 has a value above the threshold voltages of the tubes 256 and 269. Consequently, both tubes deliver plate currents, and two short voltage impulses appear substantially simultaneously across the output terminals 252, 253 and 266, 253. Since these two voltages are substantially equal, little or no resultant voltage appears across the terminals 252, 266.

*Case c.*—The pulse applied to the terminals 221 has a value smaller than the threshold of the tube 269, but larger than the threshold of the tube 256. Consequently, a plate current will pass through the tube 256 and no plate current will pass through the tube 269. Consequently, no voltage will be produced across the terminals 266, 253 and a short voltage impulse will appear across the terminals 252, 253. We obtain, therefore, across the terminals 266, 252 a voltage pulse. It is thus apparent that only those pulses that are comprised within the range determined by the value $E_1+E_c$ and $E_2+E_c$ produce corresponding output impulses across the terminals 266, 252.

The output impulses derived from terminals 266, 252 are applied through blocking capacitors 281 and 282 to an amplifier 291, the output of which is connected to leads 235 which represent the leads 171a or 170a or 158a or 157a or 156a in FIG. 1. As shown in FIG. 1, these leads are connected to the input terminals of frequency meters F. Again referring to FIG. 1, consequently we obtain across the output terminals of the respective frequency meters F D.C. voltages representing the respective rates of occurrence of the pulses passed by the respective pulse height selectors.

If we refer now to the gate 141 of FIG. 1 at normal operating condition, then the value $E_2+E_c$ determines the upper threshold, the value $E_1+E_c$ determines the lower threshold. If the sensitivity of the photomultiplier decreases then the control voltage applied to the terminals 141 decreases by an amount $\Delta E_c$ and assumes a new value $E_c - \Delta E_c$. Then the upper threshold assumes a new value corresponding to $E_2+E_c-\Delta E_c$ and the lower threshold assumes a new value corresponding to $E_1+E_c-\Delta E_c$. It is apparent that the width of the transmitted band is determined by $E_2-E_1$ and is substantially independent of the value of the control voltage. When the control voltage increases, the pass band is shifted upwards; when the control voltage decreases, the pass band is shifted downwards.

Similar relationships hold for all the remaining gates 142–145. It should be noted that under normal conditions the gates 143, 144, 145 admit very narrow bands comprising the magnitudes $OC_1$, $OD_1$, and $OD_2$, respectively. Thus in case of the gate 143 the value $E_2+E_c$ determines a value slightly over OC, the value $E_1+E_c$ determines a value slightly below OC.

Other types of controllable gate circuits are well known in the art and may be used in my invention. The FIG. 3 circuit is described herein merely by way of example and for the sake of completeness.

While I have described by invention in connection with certain specific embodiments thereof, it is to be understood that this is by way of illustration and not by way of limitation, and I do not mean to be bound thereby, but only to the scope of the appended claims.

I claim:

1. In a radiation detecting system, a first scintillation phosphor adapted to receive incident radiation and to produce first flashes of light in response thereto, a second scintillation phosphor and a standard radiation source mounted cooperatively therewith whereby said second scintillation phosphor emits standard light flashes in response to the radiation emitted by said standard source, a photoelectric device adapted to receive said first flashes and said standard flashes and to produce first electric impulses having magnitudes representing the respective intensities of said first flashes and second electrical impulses having magnitudes representing the intensities of said standard flashes, an optical attenuating system positioned between said first scintillation phosphor and said photoelectric device for selectively attenuating said first light flashes as they pass therebetween, whereby said first electrical impulses have magnitudes smaller than said second electrical impulses, and means for continuously sensing the magnitudes of said first and said second electrical impulses.

2. In a radiation detecting system, a first scintillation phosphor adapted to receive incident radiation and to produce first flashes of light in response thereto, a second scintillation phosphor and a standard radiation source mounted cooperatively therewith whereby said second scintillation phosphor emits standard light flashes in response to the radiation emitted by said standard source, a photoelectric device having controllable sensitivity and adapted to receive said first flashes and said standard flashes and to produce first electric impulses having magnitudes representing the respective intensities of said first flashes and second electrical impulses having magnitudes representing the intensities of said standard flashes, an optical attenuating system positioned between said first scintillation phosphor and said photoelectric device for selectively attenuating said first light flashes while traversing said system, whereby said first electrical impulses have magnitudes smaller than said second electrical impulses, and means selectively responsive to said second electrical impulses for controlling the sensitivity of said photoelectric device.

3. In a radiation detecting system, a first scintillation phosphor adapted to receive incident radiation and to produce first flashes of light in response thereto, a second scintillation phosphor and a standard radiation source mounted cooperatively therewith whereby said second scintillation phosphor emits standard light flashes in response to the radiation emitted by said standard source, a photoelectric device adapted to receive said first flashes and said standard flashes and to produce first electric impulses having magnitudes representing the respective intensities of said first flashes and second electrical impulses having magnitudes representing the intensities of said standard flashes, an optical attenuating system positioned between said first scintillation phosphor and said photoelectric device for selectively attenuating said first light flashes while traversing said system, whereby said first electrical impulses have magnitudes smaller than said second electrical impulses, a pulse height selector fed by said first impulses and adapted to have an effective selectivity operative to pass selectively those of said first electrical impulses within a determined range of magnitudes and to reject those outside of said range of magnitudes, and means operative responsively to changes in the magnitudes of said second electrical impulses to control the calibration of said pulse height selector.

4. In a radiation detecting system, a scintillation phosphor adapted to receive incident radiation and to produce first flashes of light in response thereto, a source of standard light flashes positioned near said scintillation phosphor, a photoelectric device positioned near said phosphor and said source adapted to receive said first flashes and said standard flashes and to produce responsively thereto first electric impulses having magnitudes representing the respective intensities of said first flashes and second electrical impulses having magnitudes representing the intensities of said standard flashes, an optical attenuating system positioned between said scintillation phosphor and said photoelectric device for selectively attenuating said first light flashes as they pass therebetween, whereby said first electrical impulses have magnitudes smaller than said second electrical impulses, and means for continuously sensing the magnitudes of said first and second electrical impulses.

5. In a radiation detecting system, a scintillation phosphor adapted to receive incident radiation and to produce first flashes of light in response thereto, a source of standard light flashes positioned near said scintillation phosphor, a photoelectric device positioned near said phosphor and said source adapted to receive said first flashes and said standard flashes and to produce responsively thereto first electric impulses having magnitudes representing the respective intensities of said first flashes and second electrical impulses having magnitudes representing the intensities of said standard flashes, an optical attenuating system positioned between said scintillation phosphor and said photoelectric device for selectively attenuating said first light flashes as they pass therebetween, whereby said first electrical impulses have magnitudes smaller than said second electrical impulses, and means for continuously sensing the magnitudes of said first and second electrical impulses, said means comprising also means selectively responsive to said second electrical impulses and operative to control the sensitivity of said photoelectric device.

References Cited in the file of this patent

UNITED STATES PATENTS

| | | |
|---|---|---|
| 2,493,346 | Herzog | Jan. 3, 1950 |
| 2,648,012 | Scherbatskoy | Aug. 4, 1953 |
| 2,659,011 | Youmans et al. | Nov. 10, 1953 |
| 2,667,586 | Kallman | Jan. 26, 1954 |
| 2,700,108 | Shamos | Jan. 18, 1955 |
| 2,758,217 | Scherbatskoy | Aug. 7, 1956 |
| 2,778,947 | Scherbatskoy | Jan. 22, 1957 |
| 2,913,669 | Herbert | Nov. 17, 1959 |
| 2,931,905 | Caha et al. | Apr. 5, 1960 |